United States Patent
Berbner et al.

(10) Patent No.: US 7,445,084 B2
(45) Date of Patent: Nov. 4, 2008

(54) SOUNDPROOF THERMAL SHIELD

(75) Inventors: Jürgen Berbner, Leverkusen (DE); Christoph Pirchl, Vaduz (LI); Christian Gnädig, Mechernich-Obergartzem (DE)

(73) Assignee: Carcoustics Tech Center GmbH, Leverkusen (DE)

( * ) Notice: Subject to any disclaimer, the term of this patent is extended or adjusted under 35 U.S.C. 154(b) by 139 days.

(21) Appl. No.: 10/535,350

(22) PCT Filed: Nov. 11, 2003

(86) PCT No.: PCT/EP03/12577

§ 371 (c)(1), (2), (4) Date: Jan. 18, 2006

(87) PCT Pub. No.: WO2004/045843

PCT Pub. Date: Jun. 3, 2004

(65) Prior Publication Data

US 2006/0124387 A1 Jun. 15, 2006

(30) Foreign Application Priority Data

Nov. 18, 2002 (DE) ................. 102 53 832

(51) Int. Cl.
 *E04B 1/82* (2006.01)
(52) U.S. Cl. .................. 181/290; 181/294; 181/286; 181/282
(58) Field of Classification Search ............ 181/290, 181/296, 284, 204, 210, 211, 207, 286, 294, 181/282; 296/39.3; 180/69.22, 69.23
See application file for complete search history.

(56) References Cited

U.S. PATENT DOCUMENTS

| | | | | |
|---|---|---|---|---|
| 3,783,969 A | * | 1/1974 | Pall ............... | 181/286 |
| 4,048,366 A | * | 9/1977 | Kingsbury ......... | 428/215 |
| 4,142,605 A | * | 3/1979 | Bosch ............. | 181/204 |
| 4,416,716 A | * | 11/1983 | Ichikawa et al. ... | 156/245 |
| 4,487,289 A | * | 12/1984 | Kicinski et al. ... | 181/252 |
| 4,522,165 A | * | 6/1985 | Ogawa ............ | 123/195 C |
| 5,057,176 A | * | 10/1991 | Bainbridge ........ | 156/222 |
| 5,134,014 A | * | 7/1992 | Zaima et al. ...... | 428/186 |
| 5,170,019 A | * | 12/1992 | Lee ............... | 181/204 |
| 5,196,253 A | * | 3/1993 | Mueller et al. .... | 428/138 |
| 5,233,832 A | * | 8/1993 | Moore, III ........ | 60/323 |

(Continued)

FOREIGN PATENT DOCUMENTS

DE 89 00 894 5/1990

(Continued)

*Primary Examiner*—Lincoln Donovan
*Assistant Examiner*—Forrest Phillips
(74) *Attorney, Agent, or Firm*—Collard & Roe, P.C.

(57) ABSTRACT

The invention relates to a soundproof thermal shield (3), particularly for motor vehicles, comprising an aluminum support (4), a noise-absorbing layer (6) and an aluminum thermal covering (7). In order to make the inventive soundproof thermal shield easy to recycle while obtaining a great thermal shielding effect and noise-absorbing power, a permeable mat made of knitted aluminum is used as a noise-absorbing layer (6), said knitted aluminum being superimposed in several layers and pressed so as to form the permeable mat. The inventive thermal shield is thus made of a single material. Preferably, the support (4) is made of a microperforated aluminum sheet while the thermal covering (7) is preferably made from an aluminum film.

14 Claims, 4 Drawing Sheets

U.S. PATENT DOCUMENTS

| | | | | |
|---|---|---|---|---|
| 5,456,291 A | * | 10/1995 | Kunzmann | 138/121 |
| 5,464,952 A | * | 11/1995 | Shah et al. | 181/211 |
| 5,503,903 A | * | 4/1996 | Bainbridge et al. | 428/182 |
| 5,550,338 A | * | 8/1996 | Hielscher | 181/290 |
| 5,590,524 A | * | 1/1997 | Moore et al. | 60/323 |
| 5,633,067 A | * | 5/1997 | Illbruck et al. | 428/138 |
| 5,670,264 A | * | 9/1997 | Sheridan | 428/594 |
| 5,680,757 A | * | 10/1997 | Pirchl | 60/299 |
| 5,681,072 A | * | 10/1997 | Stricker | 296/39.3 |
| 5,756,942 A | * | 5/1998 | Tanaka et al. | 181/207 |
| 5,800,905 A | * | 9/1998 | Sheridan et al. | 428/157 |
| 5,866,235 A | * | 2/1999 | Fredrick et al. | 428/182 |
| 5,939,212 A | * | 8/1999 | Ragland et al. | 428/594 |
| 5,968,629 A | * | 10/1999 | Masui et al. | 428/77 |
| 5,996,730 A | * | 12/1999 | Pirchl | 181/211 |
| 6,026,846 A | * | 2/2000 | Wolf et al. | 137/375 |
| 6,186,270 B1 | * | 2/2001 | Roller et al. | 181/286 |
| 6,196,488 B1 | * | 3/2001 | Sakata et al. | 242/388 |
| 6,302,466 B1 | * | 10/2001 | Zwick | 296/39.3 |
| 6,465,110 B1 | * | 10/2002 | Boss et al. | 428/608 |
| 6,586,111 B2 | * | 7/2003 | Ragland et al. | 428/593 |
| 6,647,715 B2 | * | 11/2003 | Farkas | 60/323 |
| 6,821,607 B2 | * | 11/2004 | Zwick et al. | 428/172 |
| 6,823,571 B1 | * | 11/2004 | Ragland et al. | 29/17.4 |
| 6,966,402 B2 | * | 11/2005 | Matias et al. | 181/290 |
| 2002/0185893 A1 | * | 12/2002 | Hashirayama et al. | 296/204 |
| 2004/0041428 A1 | * | 3/2004 | Tompson | 296/39.3 |
| 2004/0166296 A1 | * | 8/2004 | Ragland et al. | 428/209 |
| 2004/0238276 A1 | * | 12/2004 | Matias et al. | 181/290 |
| 2005/0133302 A1 | | 6/2005 | Pfaffelhuber et al. | 181/293 |
| 2005/0139416 A1 | * | 6/2005 | Niwa et al. | 181/207 |
| 2005/0263346 A1 | * | 12/2005 | Nishimura | 181/290 |
| 2006/0037809 A1 | * | 2/2006 | Fuller et al. | 181/207 |
| 2006/0124387 A1 | * | 6/2006 | Berbner et al. | 181/290 |
| 2007/0034446 A1 | * | 2/2007 | Proscia et al. | 181/290 |
| 2007/0137926 A1 | * | 6/2007 | Albin et al. | 181/290 |

FOREIGN PATENT DOCUMENTS

| | | |
|---|---|---|
| DE | 91 07 484 | 8/1991 |
| DE | 43 29 411 | 5/1994 |
| DE | 198 12 150 | 10/1998 |
| DE | 196 33 839 | 4/1999 |
| EP | 0 486 427 | 5/1992 |
| EP | 1 059 159 | 12/2000 |

* cited by examiner

SOUNDPROOF THERMAL SHIELD

CROSS REFERENCE TO RELATED APPLICATIONS

Applicants claim priority under 35 U.S.C. §119 of German Application No. 102 53 832.8 filed Nov. 18, 2002. Applicants also claim priority under 35 U.S.C. §365 of PCT/EP2003/012577 filed Nov. 11, 2003. The international application under PCT article 21(2) was not published in English.

The invention relates to a soundproof thermal shield, particularly for motor vehicles, comprising a support made from aluminum, a noise-absorbing layer, and a thermal covering made from aluminum.

Various designs for thermal shields of such kind are known. For example they are used in motor vehicles to prevent heat that radiates from the muffler and other parts of the exhaust system from coming into contact with the car body, and at the same time to provide effective sound insulation. Conventional thermal shields include a supporting aluminum sheet, an inner noise-absorbing layer made of mineral fibres, for example glass fibre, rock fibre, or ceramic fibre, and a closing aluminum foil. Because different materials are used in the noise-absorbing layer and the support layers, disassembling conventional thermal shields into their component materials for recycling is relatively expensive.

A heat and soundproofing material which is made from a single substance to make recycling easier is described in German Patent No. DE 43 29 411 C2 and my be used as a thermal shield in motor vehicle construction. The material consists of multiple aluminum foils, each of which has a corrugated profile of parallel peaks and valleys, gussets being folded into each of the corrugation valleys. The aluminum foils lie freely across each other and are only attached at the edge by means of a tacked seam. While this known material might create an effective thermal shield, its noise-absorbing properties would be less than satisfactory, because the aluminum foils do not have any perforations that are permeable to sound waves.

From German Utility Model DE 91 07 484 U1 a heat shield for shielding of exhaust gas leading parts at an motor vehicle from the underbody of the motor vehicle is known whose face side is constituted by a carrier sheet metal made from aluminum, which carrier sheet metal carries at its rear side a sound absorbing layer. In order to allow a material sorted disposal of the entire heat shield for recycling purposes, to remain its original layer thickness despite the necessary deformations during the production and to achieve thereby a good insulating effect, the sound absorbing layer is formed of an insert of a regular meshwork made from aluminum and at least one covering foil made from aluminum, wherein the insert is pleated to have a undulation. However, the sound absorbing effect of this heat shield is sometimes not satisfying because it is proposed to implement the pleated insert with at least two layers and to arrange in this case between two layers respectively an aluminum foil as a separating foil.

European Patent Application No. EP-A-0 486 427 discloses a disposable thermal shield for insulating vehicle parts, such as vehicle floor parts or vehicle dashboard parts, with a dimensionally stable support layer which supports a noise-absorbing thermal insulation layer and whose thermal insulating layer is provided with a protective coating at least on the side facing away from the support layer. The support layer, the thermal insulation layer and the protective coating are made from a material that is readily disposed of, particularly aluminum. In one of the several embodiments described, the thermal insulation layer is constructed in multiple plies and includes one or more plies made from a knitted aluminum fabric. In a preferred embodiment, a partially perforated aluminum sheet is particularly used as the support layer. An aluminum foil is particularly provided as the protective coating.

A thermal shield for a motor vehicle underfloor is described in German Utility Model No. 89 00 894 U, in which an insulation layer is arranged on a panel-shaped support member, this layer being covered by a protective foil on the side facing away from the support member. The support member in this thermal shield has the form of a perforated sheet metal or a meshed metallic part. The insulation layer includes a thermal insulation mat, which in turn is made essentially from organic or mineral foams, a glass fibre construction or similar. Alternatively, wrinkled aluminum foil in one or more plies may be provided as the insulation layer.

European Patent Application No. EP-A-1 059 159 discloses a rigid, plastically deformable and particularly a deep-drawn composite material having at least one middle layer and two outer layers that cover the middle layer, the middle layer and the outer layers essentially being permanently attached over the entire surface thereof. The middle layer of the flat composite material has a textile structure, is compressible and may be stretched in at least one direction and is effective of damping noise and vibrations. The middle layer may particularly comprise a knitted aluminum fabric. The outer layers may consist of from aluminum sheets or foils. This known composite material is further characterized in that the middle layer and the outer layer are glued together. Epoxy resin is used as the adhesive (bonding agent). Epoxy resin is applied by doctor on the middle layer, i.e. the middle layer is deep-impregnated with epoxy resin. Due to the bonding of the layers with epoxy resin a recycling of the composite material is impossible, or at least very expensive.

The task underlying the present invention is to create a soundproof thermal shield of the type described in the introduction, which provides highly effective heat insulation and also has a high noise-absorptivity, and is readily recyclable.

This task is solved according to the invention by the thermal shield having the features cited in claim 1. Advantageous and preferred embodiments of the invention are stated in the subordinate claims.

Since all the elements of the thermal shield according to the invention are made entirely of aluminum, the resulting material being made from a single substance is readily recyclable. The mat-like noise-absorbing layer made from multiple plies of knitted aluminum fabric lends high noise absorbing qualities, particularly of airborne sound, to the thermal shield. The compressed mat corresponds to a porous absorber. The sound waves striking the mat penetrate the narrow pores of the mat and cause the air in the pores to vibrate back and forth, so that the sound energy is converted to heat under the effects of friction. The thermal shield, which is made from aluminum, provides good thermal insulation, although the perforated aluminum support and the noise absorption layer also enhance the thermal shielding. The thermal shield may consist of an aluminum sheet or preferably an aluminum foil.

Preferably a knitted aluminum fabric in the form of single-thread knitted fabric is used for the noises-absorbing layer. It is relatively easy to vary both the stitch width and the stitch structure of such a knitted aluminum material. By varying the stitch width and stitch structure, it is possible to alter the porosity and/or permeability, and thus also the noise absorption capacity, of the noise absorption layer. In this context, it has proven advantageous if the knitted aluminum fabric is structured such that the average distance between two consecutive stitch wales is larger or smaller than the average distance between the two legs of a stitch. A further advantageous configuration consists particularly in that the knitted aluminum fabric includes stitch wales and/or stitch rows of varying width.

The invention will be explained in greater detail in the following with reference to a drawing representing several embodiments. In the drawing, which is not to scale:

Figure 1:
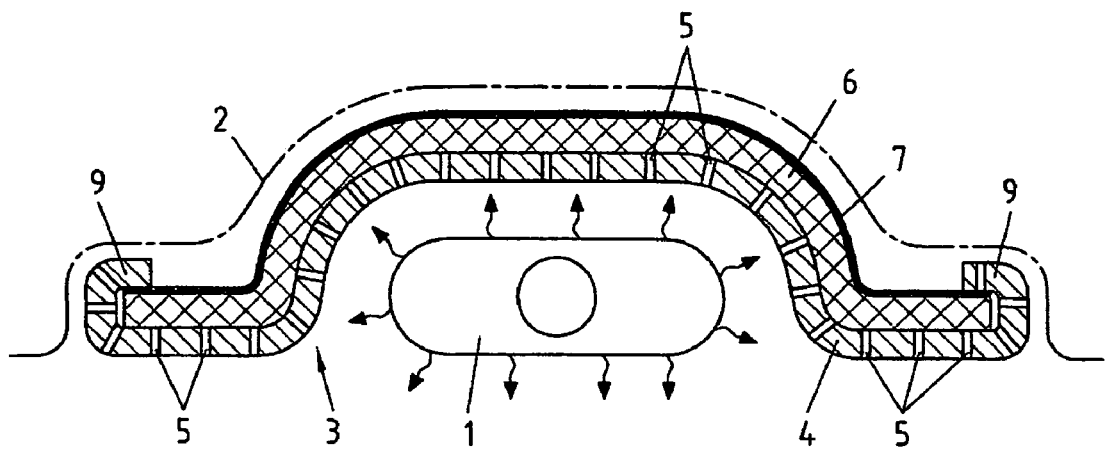
FIG. 1 is a cross-section of a thermal shield between a muffler and a car body floor pan.

FIG. 1 is a schematic representation of a vehicle muffler 1 that emits noise and heat. Muffler 1 is insulated from a floor pan 2 of the vehicle by a trough-shaped or concave thermal shield 3, which also has the effect of insulating airborne noise. Thermal shield 3, which is not drawn to scale has a support 4 made from aluminum, the free side of which is facing the muffler 1. Support 4 consists of a smooth, perforated aluminum sheet having a thickness in the range from 0.5 to 0.8 mm.

It is evident that support 4 has a plurality of apertures 5 to allow noise to pass through. The diameter of these noise pass-through apertures 5 is in the range from 0.1 to 3 mm. A design in which the diameter of the noise pass-through apertures 5 is between 0.1 and 1.9 mm and the support surface has up to 24 noise pass-through apertures 5 per cm$^2$ is preferred.

A noise-absorbing layer 6 serving particularly to dampen airborne noise is arranged on the inner side of support 4, and is covered by a thermal covering 7 made from aluminum. The thermal covering 7 facing vehicle floor pan 2 consists preferably of an aluminum foil having a thickness in the range from 20 to 80 μm, for example about 50 μm. Thermal covering or aluminum foil 7 may comprise microperforations. The diameter of the microperforation holes (not shown) is in the range from 0.1 to 1 mm, wherein up to 12 holes per cm$^2$ may be present.

A mesh-type aluminum support may be used instead of thin microperforated aluminum sheet 4, in which case a noise-permeable aluminum foil is preferably arranged between the support and noise absorption layer 6.

The support 4, noise absorption layer 6, and thermal covering 7 of thermal shield 3 are connected to each other by flanging of support 4. The edges of noise absorption layer 6 and of thermal covering 7 are trapped together in flanged border 9. Thermal shield 3 is affixed to the underside of vehicle floor pan 2 preferably by heat and soundproofing fixtures (not shown), for example plastic screws with washers or spacers made from an elastomer material.

Figure 2:
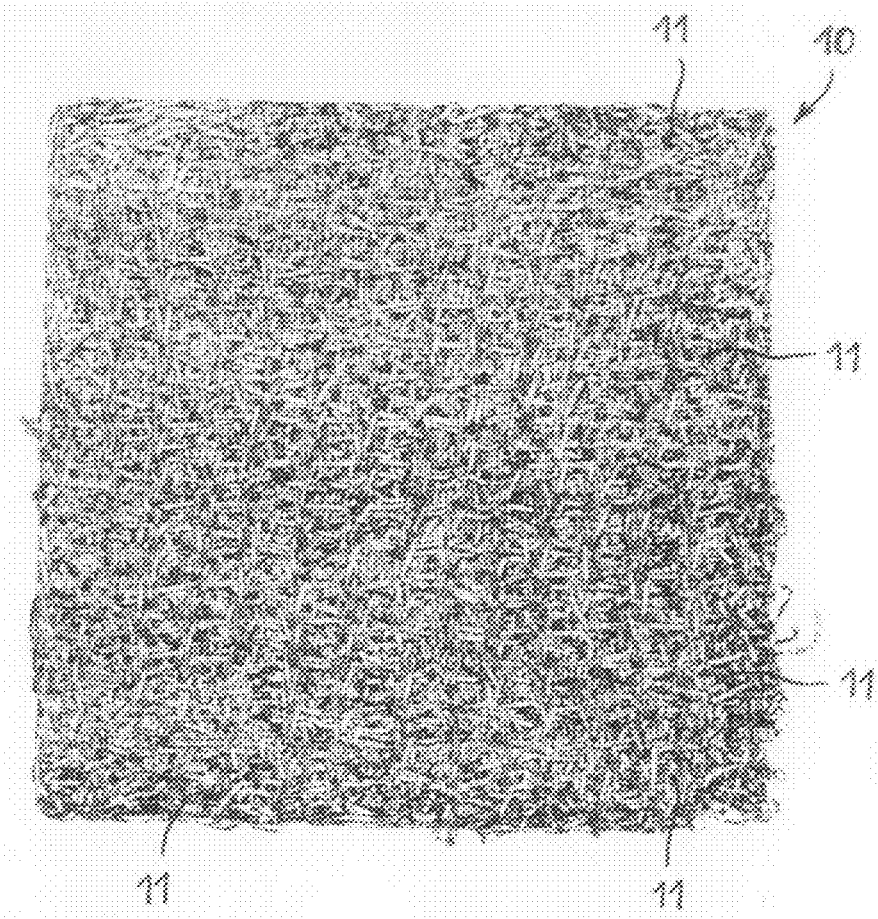
FIG. 2 is a plan view of a section of a mat-type noise absorption layer in a thermal shield according to the invention.

Noise absorption layer 6 is constructed from multiple superimposed plies of a knitted aluminum fabric, in which the plies are compressed to create a mat 10 that is air and gas permeable. Mat 10 is constructed from at least five superimposed plies of knitted aluminum fabric. Mat 10 is an essentially flat formation with relatively high bending strength. A portion of such a mat 10 is shown in FIG. 2. The plate-like mat 10 or noise absorption layer 6 has a plurality of small, branched openings or narrow channels 11. In effect, mat 10 thus forms a microporous structure with a plurality of small, open pores. The thickness of noise absorption layer 6 or mat 10 is in the range from 0.5 to 3 mm. It has a weight per unit area in the range of 8 to 15 g/dm$^2$. The flow resistance per unit length of mat 10 is equal to or greater than 5 kNs/m$^4$, preferably equal to or greater than 20 kNs/m$^4$ in accordance with DIN 52213.

Figure 3A:
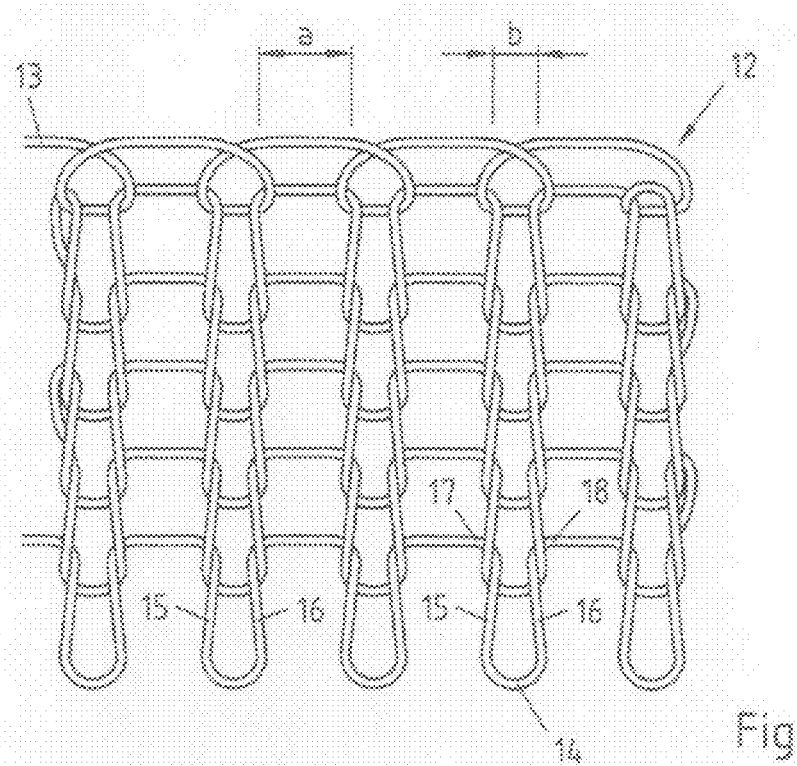
FIG. 3A is a schematic representation of a section of a single ply of a knitted aluminum fabric.

FIG. 3A shows a portion of a single ply 12 of the knitted aluminum fabric. It is evident that the knitted aluminum fabric is a single-thread knitted fabric, i.e. that the stitched surface is formed by plaiting a single, transversely running strip-like aluminum thread 13. Each stitch consists of a head 14, two legs 15, 16 and two feet 17, 18. The adjacent stitches form a correspondingly transverse stitch row, while several superimposed stitches form a so-called stitch wale.

The knitted aluminum fabric is constructed such that the average distance a between two consecutive stitch wales is significantly greater than the average distance b between the two legs 15, 16 of a stitch. In the embodiment shown, the average distance a between two consecutive stitch wales is about twice as large as the average distance b between the two legs 15, 16 of a stitch.

Figure 3B:
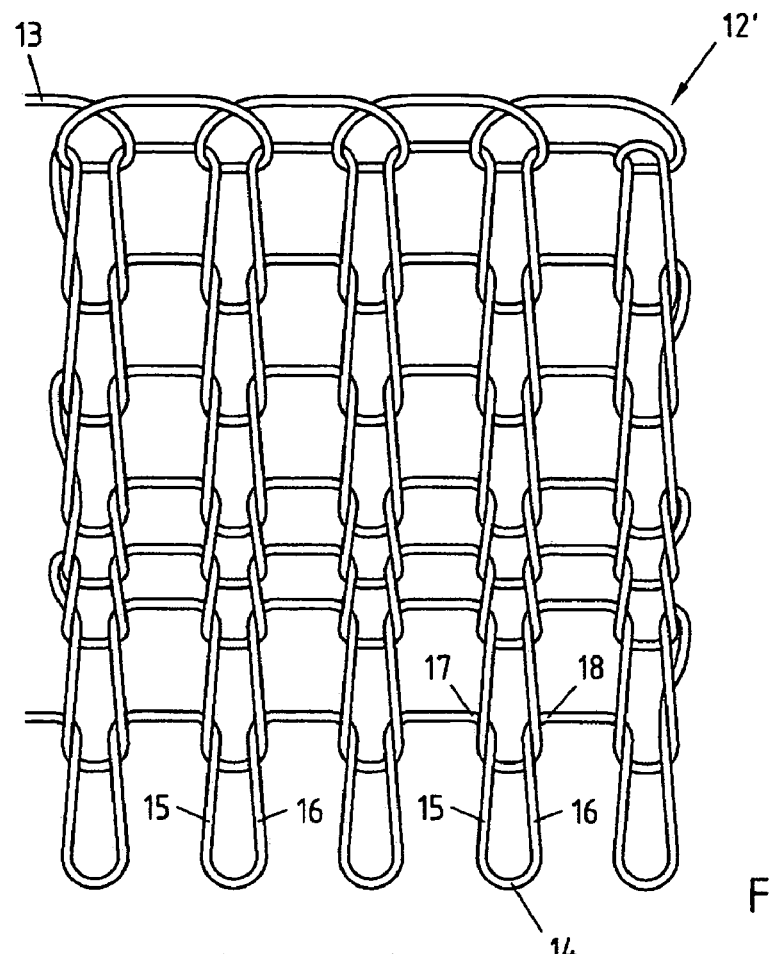
FIGS. 3B and 3C show views, similar to FIG. 3A, of a knitted aluminum fabric which has stitch rows of varying width (FIG. 3B) and of a knotted aluminum fabric which has stitch wales of varying width (FIG. 3C), respectively.
Figure 3C:
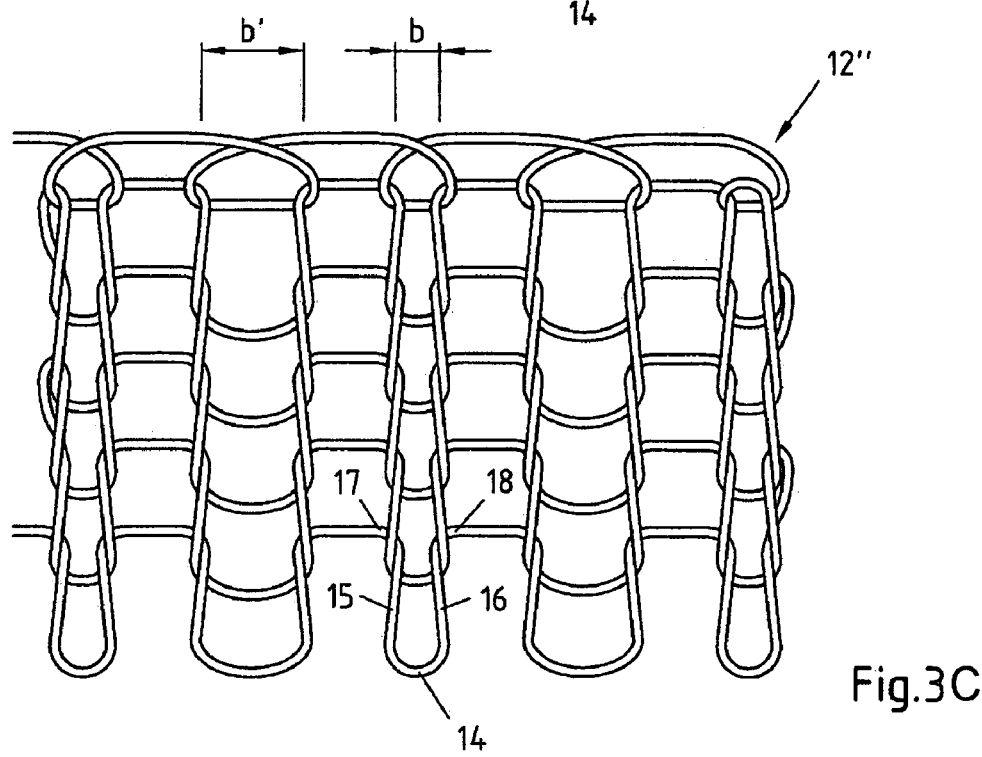

FIG. 3B shows a single ply 12' of a knitted aluminum fabric which has stitch rows of varying width. FIG. 3C shows a single ply 12" of a knitted aluminum fabric which has stitch wales of varying width. As shown in FIG. 3C, the average distance between two legs 15, 16 of a stitch varies between b and b'.

Figure 4:
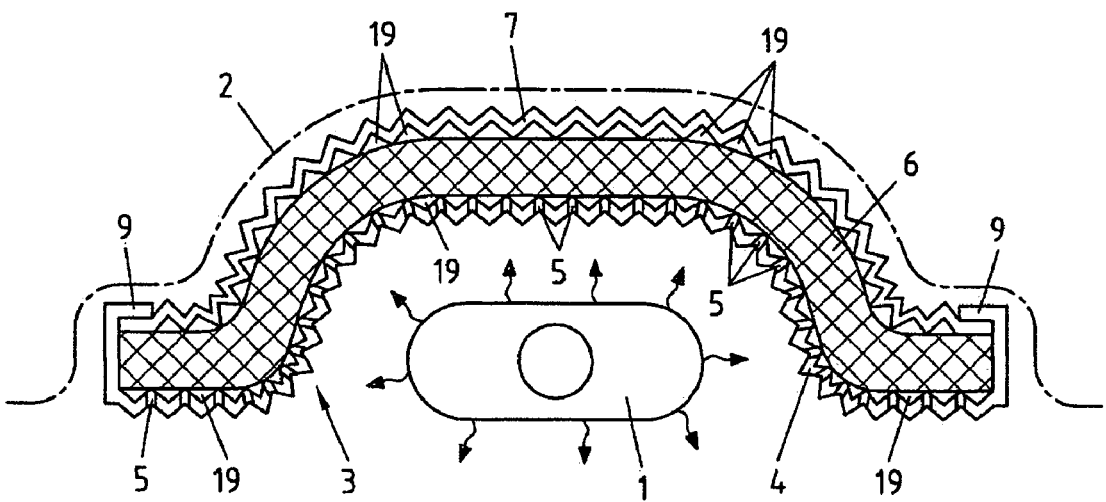
FIG. 4 is a cross-section of a thermal shield according to a second embodiment between a muffler and a car body floor pan.

The embodiment shown schematically in FIG. 4, which is also not drawn to scale, differs from the embodiment shown in FIG. 1 in that support 4 and thermal covering 7 are profiled. Both support 4 and thermal covering 7 have a zig-zag profile, which is created for example by corresponding compression forming. The zig-zag profiles of support 4 and thermal covering 7 form gusset-shaped cavities 19 in the upper and lower sides of noise absorption layer 6, which particularly have a heat insulating effect.

Support 4 is also provided with a plurality of noise pass-through apertures 5. When viewed from the direction of the muffler 1, the apertures 5 are each disposed at the bottom of the gusset valleys. Noise pass-through apertures may also be disposed on the outer gusset peaks of support 4 besides or instead of this arrangement.

Figure 5:
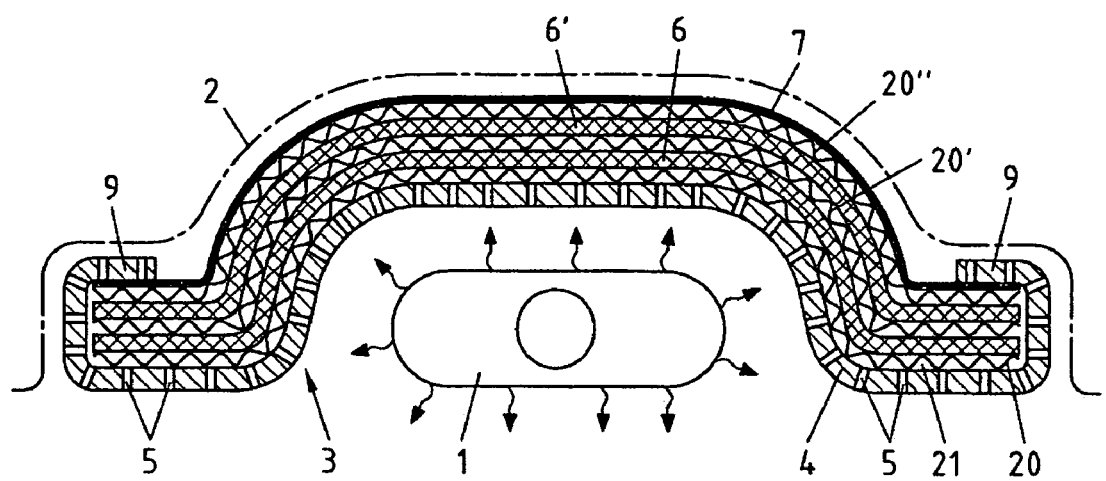
FIG. 5 is a cross-section of a thermal shield according to a third embodiment between a muffler and a car body floor pan.

A third embodiment is shown in FIG. 5, in which thermal shield 3 again comprises an aluminum support 4 with a smooth surface, a noise absorption layer 6 and a thermal covering 7 made from aluminum foil. This embodiment differs from the embodiment shown in FIG. 1 primarily in that a spacer 20 is arranged between perforated support 4 and noise absorption layer 6. Spacer 20 consists of a profiled aluminum foil, which is preferably perforated. Aluminum foil 20 is constructed in a corrugated, zig-zag, or other such profiled manner, with the result that a slit-shaped air gap 21 is created, particularly with thermal insulating effect, between support 4 and noise absorption layer 6.

The embodiment according to FIG. 5 further differs from the embodiment shown in FIG. 1 in that thermal shield 3 has an additional noise absorption layer 6', wherein a spacer 20' is also arranged between the two noise absorption layers 6, 6'. Spacer 20' may be constructed like the spacer 20. It serves to create a heat insulating air gap and may consist particularly of a profiled and perforated aluminum foil. A correspondingly profiled spacer 20" is also provided between noise absorption layer 6' and thermal covering 7.

As in both of the previous embodiments, noise absorption layers 6, 6' are each made from several plies of a knitted aluminum fabric that have been compressed to form permeable mat. Noise absorption layers 6, 6' thus have the form of flat compressed mats.

The performance of the invention is not limited to the embodiments described above. On the contrary, a range of variants are possible that are also based on the inventive idea defined in the attached claims, while differing fundamentally in construction. For example, the thermal shield 3 according to the invention may be used not only for covering a muffler 1 or other parts of a motor vehicle exhaust system, but also for example for shielding areas of the engine block from the dashboard of the passenger compartment. In particular, it is within the scope of the present invention to combine individual features of the embodiments described above.

The invention claimed is:

1. A soundproof thermal shield (3) for motor vehicles, comprising a support (4) made from aluminum, at least one noise-absorbing layer (6), and a thermal covering (7) made from aluminum, wherein the at least one noise-absorbing layer (6) is created from multiple plies (12) of knitted aluminum fabric wherein at least 5 superimposed plies (12) of knitted aluminum fabric are compressed to create a permeable mat (10) in such manner that the mat (10) has a thickness in the range from 0.5 to 3 mm and a microporous structure with a plurality of narrow, branched channels (11), wherein the support (4) has a free side with a plurality of noise pass-through apertures (5) the diameter of which is in the range from 0.1 to 1.9 mm, up to 24 noise pass-through apertures (5) per $cm^2$ being arranged thereon.

2. The thermal shield according to claim 1, wherein the mat (10) has a weight per unit area in the range of 8 to 15 $g/dm^2$.

3. The thermal shield according to claim 1, wherein the mat (10) has a flow resistance per unit length of equal to or greater than 5 $kNs/m^4$.

4. The thermal shield according to claim 1, wherein the knitted aluminum fabric is in the form of a single-thread knitted fabric.

5. The thermal shield according to claim 1, wherein the knitted aluminum fabric is constructed such that the average distance (a) between two consecutive stitch wales is greater than the average distance (b) between the two legs (15, 16) of a stitch.

6. The thermal shield according to claim 1, wherein the knitted aluminum fabric has stitch wales and/or stitch rows of varying width.

7. The thermal shield according to claim 1, wherein the support (4) has a thickness of 0.5 to 0.8 mm.

8. The thermal shield according to claim 1, wherein the thermal covering (7) is made from aluminum foil.

9. The thermal shield according to claim 1, wherein the thermal covering (7) is microperforated.

10. The thermal shield according to claim 1, wherein the support (4) and/or thermal covering (7) are profiled.

11. The thermal shield according to claim 1, wherein the support has an essentially flat surface.

12. The thermal shield according to claim 1, wherein a spacer (20, 20") is arranged between the support (4) and the noise absorption-layer (6) and/or between the noise absorption layer (6') and the thermal covering (7).

13. The thermal shield according to claim 1, wherein at least two noise absorption layers (6, 6') are present, a spacer (20') being arranged therebetween.

14. The thermal shield according to claim 12, wherein the spacer is made from a profiled aluminum foil.

* * * * *